United States Patent
Qin

(10) Patent No.: US 11,388,363 B2
(45) Date of Patent: Jul. 12, 2022

(54) TV SET AND BACKLIGHT CONTROL METHOD, CONTROL DEVICE AND READABLE STORAGE MEDIUM OF THE TV SET

(71) Applicant: SHENZHEN SKYWORTH-RGB ELECTRONIC CO., LTD., Shenzhen (CN)

(72) Inventor: Jilei Qin, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 17/276,544

(22) PCT Filed: Aug. 24, 2020

(86) PCT No.: PCT/CN2020/110813
§ 371 (c)(1),
(2) Date: Mar. 16, 2021

(87) PCT Pub. No.: WO2021/047379
PCT Pub. Date: Mar. 18, 2021

(65) Prior Publication Data
US 2022/0014706 A1   Jan. 13, 2022

(30) Foreign Application Priority Data
Sep. 11, 2019   (CN) .......................... 201910859789.9

(51) Int. Cl.
*H04N 5/58* (2006.01)
*G09G 3/34* (2006.01)

(52) U.S. Cl.
CPC ............. *H04N 5/58* (2013.01); *G09G 3/3406* (2013.01); *G09G 2360/144* (2013.01)

(58) Field of Classification Search
CPC ...... H04N 5/58; H04N 9/73; G09G 2360/144; G09G 3/3406; G09G 2320/0626
(Continued)

(56) References Cited

U.S. PATENT DOCUMENTS 6,952,195 B2   10/2005   Arakawa
7,744,216 B1    6/2010   Uhlhorn
(Continued)

FOREIGN PATENT DOCUMENTS

CN   101567171 A   10/2009
CN   102314848 A    1/2012
(Continued)

OTHER PUBLICATIONS

First Office Action issued in counterpart Chinese Patent Application No. 201910859789.9, dated Feb. 2, 2021.
(Continued)

*Primary Examiner* — Sherrie Hsia
(74) *Attorney, Agent, or Firm* — Westbridge IP LLC

(57) ABSTRACT

The disclosure discloses a TV backlight control method, which includes the following operations: acquiring current first ambient brightness information and a user type in a space where a TV set is located; determining a backlight adjustment value according to the first ambient brightness information and the user type. The brightness value of the TV backlight is reduced according to the backlight adjustment value. The present disclosure further discloses a control device, a TV set and a readable storage medium.

11 Claims, 4 Drawing Sheets

(58) Field of Classification Search
USPC ........ 348/602, 603, 687; 345/102; 362/97.1, 362/97.2
See application file for complete search history.

(56) References Cited

U.S. PATENT DOCUMENTS

2017/0263192 A1   9/2017  Luna et al.
2020/0126494 A1*  4/2020  Chen ..................... G09G 5/10

FOREIGN PATENT DOCUMENTS

| CN | 102842291 A | 12/2012 |
| CN | 105187626 A | 12/2015 |
| CN | 105931615 A | 9/2016 |
| CN | 106507005 A | 3/2017 |
| CN | 107390858 A | 11/2017 |
| CN | 107835324 A | 3/2018 |
| CN | 108810433 A | 11/2018 |
| CN | 108920577 A | 11/2018 |
| CN | 109034752 A | 12/2018 |
| CN | 109255651 A | 1/2019 |
| CN | 106057171 B | 5/2019 |
| CN | 110572596 A | 12/2019 |
| JP | H0937196 A | 2/1997 |

OTHER PUBLICATIONS

International Search Report and Written Opinion issued in corresponding PCT Application No. PCT/CN2020/110813, dated Nov. 25, 2020.

Second Office Action issued in counterpart Chinese Patent Application No. 201910859789.9, dated May 27, 2021.

Extended European Search Report issued in counterpart European Patent Application No. 20861997.3, dated May 9, 2022.

\* cited by examiner

TV SET AND BACKLIGHT CONTROL METHOD, CONTROL DEVICE AND READABLE STORAGE MEDIUM OF THE TV SET

CROSS REFERENCE TO RELATED APPLICATIONS

This disclosure is the National Stage of International Application No. PCT/CN2020/110813, filed on Aug. 24, 2020, which claims priority to Chinese Patent Application No. 201910859789.9 filed in the China Patent Office on Sep. 11, 2019, entitled "TV SET AND BACKLIGHT CONTROL METHOD, CONTROL DEVICE AND READABLE STORAGE MEDIUM OF THE TV SET", the entire contents of which are hereby incorporated by reference.

TECHNICAL FIELD

The present disclosure relates to the technical field of TV set, in particular to a TV backlight control method, a control device, a TV set and a readable storage medium.

BACKGROUND

At present, most TV sets are equipped with backlight devices, and the backlight generated by the backlight devices is used for picture display. The brightness of the backlight generated by the backlight device directly affects the brightness of the picture of the TV set. Under brightness of different environments, users have different requirements of brightness for picture of the TV set, and different types of users have different requirements of brightness for picture of the TV set as well.

However, the current TV backlight can only be adjusted when the user feels uncomfortable or unaccommodated and the user sends out instructions to the TV set to adjust the brightness through remote control and the like, and the TV set cannot adjust the backlight to meet the needs of the user in the current environment, therefore, causing complicated operation of the user and easily damaging the eyesight of the user due to improper backlight generated by the TV set.

The above content is only used to assist in understanding the technical scheme of this disclosure and does not mean that the above content is recognized as prior art.

SUMMARY

The main purpose of the present disclosure is to provide a TV backlight control method, which aims to realize automatic adjustment of backlight to adapt to different environments and different user requirements, simplify user operation and ensure vision health of the users.

In order to achieve the above object, the present disclosure provides a TV backlight control method, which includes the following operations:

acquiring current first ambient brightness information and a user type in the space where the TV set is located;

determining a backlight adjustment value according to the first ambient brightness information and the user type; and reducing a brightness value of a TV backlight of the TV set, according to the backlight adjustment value.

In one embodiment, the operation of determining a backlight adjustment value according to the first ambient brightness information and the user type includes:

determining a first adjustment value according to the first ambient brightness information;

determining a second adjustment value according to the user type; and determining the backlight adjustment value according to the first adjustment value and the second adjustment value.

In one embodiment, the operation of determining the first adjustment value according to the first ambient brightness information includes:

determining that the first adjustment value is a first value after determining that the first ambient brightness information is a first preset brightness information;

determining that the first adjustment value is a second value after determining that the first ambient brightness information is a second preset brightness information;

a brightness corresponding to the first preset brightness information is smaller than a brightness corresponding to the second preset brightness information, and the first value is greater than the second value; and/or, the operation of determining the second adjustment value according to the user type includes:

determining that the second adjustment value is a third value after determining that the user type is a child;

determining that the second adjustment value is a fourth value after determining that the user type is an adult;

the third value is greater than the fourth value.

In one embodiment, prior to the operation of acquiring current first ambient brightness information and a user type in a space where a TV set is located, the method further includes:

obtaining a plurality of second ambient brightness information in the space where the TV set is located within a first preset duration;

counting a number of times of alternate appearance of a plurality of different preset brightness information after determining that the plurality of different preset brightness information alternately appear among the plurality of second ambient brightness information;

determining whether the number of times is less than a first preset threshold value;

after determining that the number of times is less than the first preset threshold value, executing the operation of acquiring current first ambient brightness information and a user type in a space where a TV set is located.

In one embodiment, after the operation of determining whether the number of times is less than a first preset threshold value, the method further includes:

controlling a brightness value of the TV backlight to be adjusted to be not greater than a first preset brightness value after determining that the number of times is not less than the first preset threshold value.

In one embodiment, before the operation of acquiring a plurality of second ambient brightness information in the space where the TV set is located within a first preset duration, the operation further includes:

acquiring a current time of the TV set;

determining whether the time is within a preset duration;

after determining that the time is within the preset duration, executing the operation of acquiring a plurality of second ambient brightness information in the space where the TV set is located within a first preset duration.

In one embodiment, after the operation of determining whether the time is within a preset duration, the method further includes:

acquiring a plurality of third ambient brightness information in the space where the TV set is located within a second preset duration after determining that the time is not within the preset duration;

calculating an occurrence frequency of the first preset brightness information in the plurality of third ambient brightness information;

controlling the brightness value of the TV backlight to be adjusted to be not greater than the second preset brightness value after determining that the frequency is not less than the second preset threshold value.

In one embodiment, the operation of acquiring current first ambient brightness information and a user type in a space where the TV is located includes:

acquiring the current first ambient brightness information and the user type in the space where the TV set is located based on first image data in the space collected by a camera; and/or, the operation of acquiring a plurality of second ambient brightness information in the space where the TV set is located within the first preset time length includes the following operations:

acquiring the plurality of second ambient brightness information in the space where the TV set is located based on second image data in the space collected by the camera within the first preset duration; and/or, the operation of acquiring a plurality of third ambient brightness information in the space where the TV set is located within a second preset duration includes the following operation:

obtaining the plurality of second ambient brightness information in the space where the TV set is located in the second preset duration, based on third image data in the space collected by the camera.

In addition, to realize the above purpose, the present disclosure further provides a control device, the control device includes: a memory, a processor, and a TV backlight control program stored on the memory and operable on the processor, when the TV backlight control program is executed by the processor, any of the TV backlight control methods above is executed.

In addition, to realize the above purpose, the present disclosure further provides a TV set including:

a camera;

a display device including a display panel and a backlight module connected with the display panel; and the control device as described above, where both of the camera and the backlight module are connected with the control device.

In addition, to realize the purpose above, the present disclosure further provides a readable storage medium, a TV backlight control program is stored on the readable storage medium, and when TV backlight control program is executed by a processor, any of the TV backlight control methods above is executed.

The disclosure provides a TV backlight control method. The method determines the backlight adjustment value according to the ambient brightness information and the user type in the space where the TV is located, and reduces a brightness value of the TV backlight according to the backlight adjustment value, without requiring user operation, and the TV may automatically adjust the backlight according to the current ambient brightness and the user type, thereof simplifying the user operation and ensuring the user's eyesight health.

The realization, functional features and advantages of the present disclosure will be further explained in connection with embodiments and with reference to the accompanying drawings.

DETAILED DESCRIPTION OF THE EMBODIMENTS

It should be understood that the specific embodiments described herein are intended to explain the disclosure only and are not intended to limit the disclosure.

The main solution of the embodiment of the present disclosure is: obtaining a current first ambient brightness information and a user type in the space where the TV set is located; determining a backlight adjustment value according to the first ambient brightness information and the user type; reducing a brightness value of the TV backlight according to the backlight adjustment value.

In the related art, the TV backlight needs to be manually adjusted by the user and cannot be automatically adjusted in different environments for different users, resulting in complicated operation of the user, and it is easy to cause improper backlight generated by the TV to damage the eyesight of the user.

The disclosure provides the above-mentioned solution, aiming at realizing automatic adjustment of backlight to adapt to different environments and different user requirements, simplifying user operation and ensuring user vision health.

A TV set is provided in embodiments of the present disclosure. The TV set can be any type of TV such as LCD TV, OLED TV, plasma TV, etc.

Figure 1:
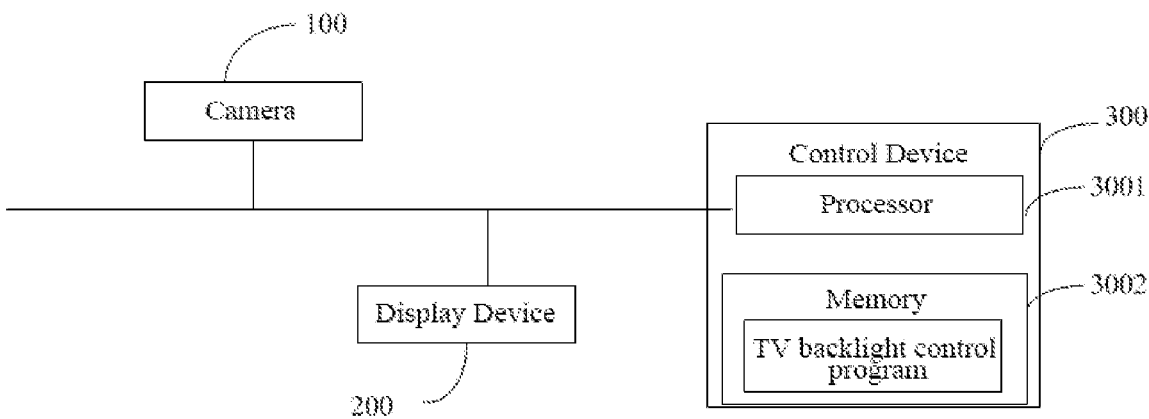
FIG. 1 is a schematic diagram of a hardware structure of an embodiment of a TV set of the present disclosure.

According to FIG. 1, the TV set includes a camera 100, a display device 200, and a control device 300. Among them, the display device 200 is a TV main body structure formed by components related to TV screen display. The display device 200 specifically includes a display panel and a backlight module connected to the display panel. The camera 100 may be mounted on the display device 200 or may be mounted independently of the display device 200. Specifically, in the present embodiment, the camera 100 is a retractable camera mounted on the display device 200. When the camera 100 is used by any application, the camera 100 protrudes from the display device, and when the camera 100 is not used by any application, the camera 100 is retracted into the display device 200. The control device 300 is connected with the camera 100, and can be used for acquiring state data returned by the camera 100, controlling the resource allocation of the camera 100 in the TV built-in system, controlling the expansion and contraction of the camera 100, etc. In addition, the control device 300 may also be connected with the display device 200 to control the operation of the display device 200. Specifically, the control device 300 is connected to the backlight module in the display device 200 to control the backlight brightness emitted by the backlight module.

In the embodiment of the present disclosure, according to FIG. 1, there are a processor 3001, such as a CPU, a memory 3002, and the like. The memory 1002 may be a high-speed RAM memory or a non-volatile memory, such as a magnetic disk memory. The memory 3002 may optionally further be a storage device independent of the aforementioned processor 1001. The processor 3001 is respectively connected to the memory 3002, the above-described camera 100, the display device 200, and the like.

As will be appreciate by those skilled in that art, the arrangement of the device shown in FIG. 1 does not constitute a definition of the device, which may include more or fewer components than shown, or combination of certain components, or different arrangement of components.

As shown in FIG. 1, a TV backlight control program may be included in the memory 1002 as a readable storage medium. In the device shown in FIG. 1, the processor 1001 may be used to call the TV backlight control program stored in the memory 1002 and perform the relevant operations of a TV backlight control method in the following embodiments.

In this embodiment, the built-in operating system of the TV set is an Android system. The TV backlight control program executed by the above control device 300 is executed based on an upper layer application of the Android system.

A TV backlight control method is also provided.

Figure 2:
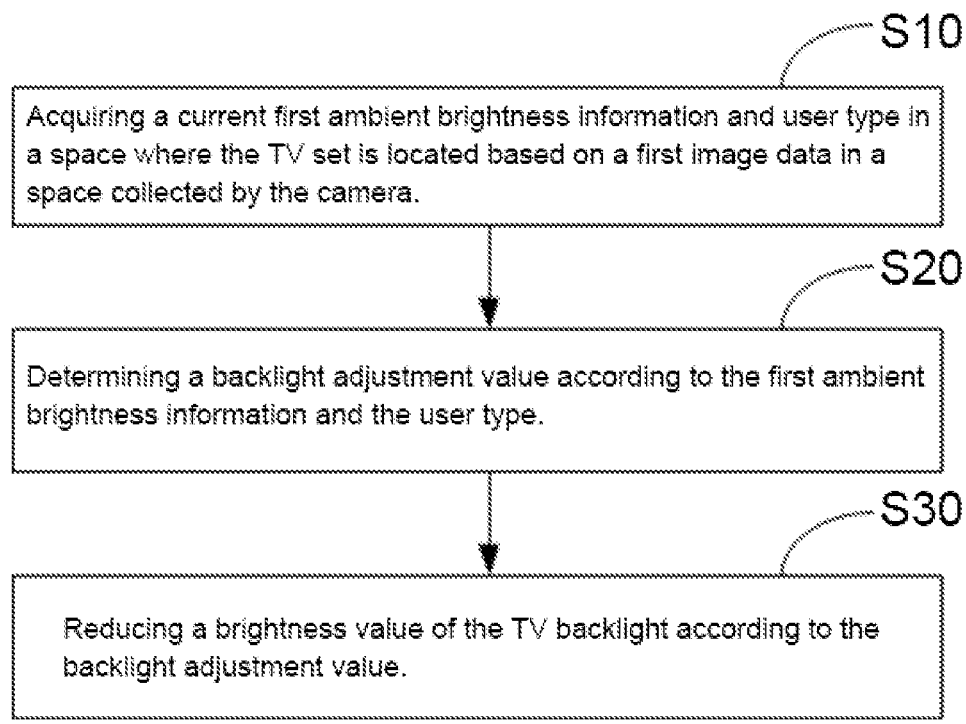
FIG. 2 is a flow diagram of a first embodiment of a TV backlight control method of the present disclosure.

According to FIG. 2, a first embodiment of a TV backlight control method of the present disclosure is present, the TV backlight control method includes:

acquiring current first ambient brightness information and a user type in a space where a TV set is located.

The first ambient brightness information may specifically be information characterizing a brightness condition in the space where the TV set is located. Specifically, a brightness value in the space where the TV set is located can be obtained as the first ambient brightness information, or after the brightness value in the space where the TV set is located is obtained, determining a corresponding brightness state as the first ambient brightness information according to a numerical interval where the brightness value is located. The first ambient brightness information can be obtained from data detected by a light detection device (such as a illuminometer) provided in the space where the TV set is located, and the first ambient brightness information can also be obtained from image data detected by a camera provided in the space where the TV set is located. In this embodiment, the first ambient brightness information is a brightness state determined according to the brightness value in the space where the TV set is located, including a dark state, a highlighted state and a normal state. In addition, in other embodiments, the first ambient brightness information may also include a very dark state, a darker state, a normal state, a brighter state, a very bright state, and the like.

User types can be classified according to actual requirements. In this embodiment, the user types may specifically include children and adults. In addition, in other embodiments, children, young people, the elderly and the like may also be included. The method of obtaining the user type can be selected according to actual needs. For example, the height of the user in the space where the TV set is located can be detected by infrared, and the user type in the space where the current TV set is located can be obtained according to the height. The camera can also obtain images in the space where the TV set is located, and the user type in the space where the current TV set is located can be determined through face recognition or height recognition.

Specifically, the first ambient brightness information and the user type are acquired during the operation of the TV set.

Operation S20, determining a backlight adjustment value according to the first ambient brightness information and the user type.

Different backlight adjustment values are set corresponding to different ambient brightness information and user types. The corresponding relationship between ambient brightness information and user types and backlight adjustment values can be set according to actual requirements. The correspondence relationship can be either a quantitative relationship or a mapping relationship. Specifically, when the corresponding relationship is a preset quantitative relationship, a first calculated value corresponding to the first ambient brightness information can be determined, a second calculated value corresponding to the user type can be determined, and a backlight adjustment value can be calculated by putting the determined first calculated value and the second calculated value into the preset quantitative relationship. Further, a backlight adjustment value lookup table may be established in advance according to the corresponding relationship, each row represents backlight adjustment values corresponding to various preset ambient brightness information. Each column represents backlight adjustment values corresponding to various preset user types. The boundary value between a certain row and a certain column is the backlight adjustment value corresponding to the preset ambient brightness information of the row and the preset user type of the column, so the current backlight adjustment value can be determined by querying the backlight adjustment value lookup table according to the first ambient brightness information and the user type.

Different operation modes can be set up according to the needs of the users in the TV system, different operation modes represent different requirements of users for TV backlight, and different corresponding relationships can be set under different operation modes, so that the current operation mode of the TV system can be obtained, and the corresponding relationships can be obtained according to the operation modes, so as to determine the backlight adjustment value corresponding to the current first ambient brightness information and the user type.

Operation S30, reducing a brightness value of the TV backlight according to the backlight adjustment value.

Specifically, in order to ensure the eyesight health of users, the brightness value after the brightness value of the current backlight of the TV set is reduced based on the backlight adjustment value is taken as the target brightness value, and the brightness value of the backlight of the TV set is adjusted to the target brightness value. It should be noted that before operation S30, it can also be judged whether the brightness value of the current backlight of the TV set is within a preset range, and operation S30 is executed only when the brightness value of the current backlight of the TV set is within the preset range. If the brightness value of the current backlight of the TV set is not within the preset range, operation S30 is not executed and the backlight is not adjusted.

The present disclosure provides a TV backlight control method, the method determines the backlight adjustment value according to the ambient brightness information and the user type in the space where the TV set is located, adjusts the brightness value of the TV backlight according to the backlight adjustment value, which does not require user operation. The TV set can automatically adjust the backlight according to the current ambient brightness and the user type, therefore simplifying the user operation and ensuring the user's eyesight health.

Figure 3:
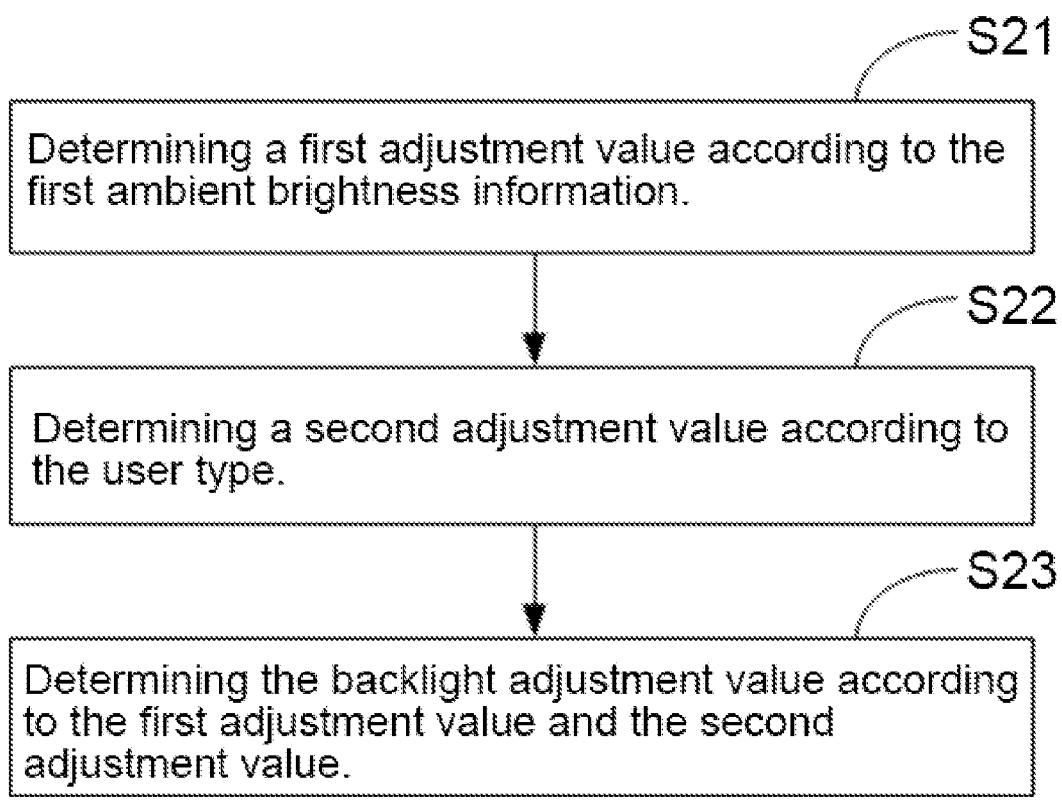
FIG. 3 is a detailed flow diagram of operation S20 in FIG. 2.

Specifically, in the first embodiment, according to FIG. 3, operation S20 specifically comprises:

Operation S21, determining a first adjustment value according to the first ambient brightness information.

Different first ambient brightness information is correspondingly set with different first adjustment values. The larger the brightness of the space in which the TV set is located corresponding to the ambient brightness information, the larger the corresponding first adjustment value.

Operation S22, determining a second adjustment value according to the user type.

Different user types are correspondingly set with different second adjustment values. Specifically, the backlight adjustment value corresponding to the child type in the user type is greater than the backlight adjustment value of the adult type.

Operation S23, determining the backlight adjustment value according to the first adjustment value and the second adjustment value.

Specifically, the sum of the first adjustment value and the second adjustment value may be taken as the backlight adjustment value. In addition, the first ambient brightness information and the user type may also be respectively provided with a first weight and a second weight, and the backlight adjustment value may be calculated according to the first adjustment value and the first weight, the second adjustment value and the second weight.

Through the above-mentioned method, after determining respective corresponding adjustment values according to the first ambient brightness information and the user type respectively, the backlight adjustment value is determined again, so as to ensure that the TV can automatically adapt to different user types and different ambient brightness to accurately adjust the TV backlight.

Further, based on the above-mentioned first embodiment, a second embodiment of the TV backlight control method of the present disclosure is proposed. In the second embodiment, in order to ensure the user's vision health, operation S30 includes: reducing the brightness value of the TV backlight according to the backlight adjustment value to prevent the TV backlight from being too bright to damage the user's vision. Based on the adjustment mode, operation S21 includes the following operations: determining that the first adjustment value is a first value after determining that the first ambient brightness information is a first preset brightness information; determining that the first adjustment value is a second value after determining that the first ambient brightness information is a second preset brightness information. The brightness corresponding to the first preset brightness information is smaller than the brightness corresponding to the second preset brightness information, and the first value is greater than the second value. Specifically, the first ambient brightness information is specifically highlighted, and the second ambient brightness information is specifically dark. The first value is specifically 40 and the second value is specifically 30. In addition, when the first ambient brightness information is in a normal state, the first adjustment value is specifically 0. Operation S22 includes: determining that the second adjustment value is a third value after determining that the user type is a child; determining that the second adjustment value is a fourth value after determining that the user type is an adult. The third value is greater than the fourth value. The third value is specifically 50 and the fourth value is specifically 40.

In the embodiment, through the above-mentioned method, it can be ensured that the backlight emitted by the TV set will not make the user feel dazzling in a dark environment, and that the backlight emitted by the TV set will ensure the display quality and will not be too bright to damage the eyesight of the user in a brighter environment. In addition, since children's eyesight is more vulnerable, the above-mentioned method can further ensure that the TV backlight will not affect the eyesight of children users.

Figure 4:
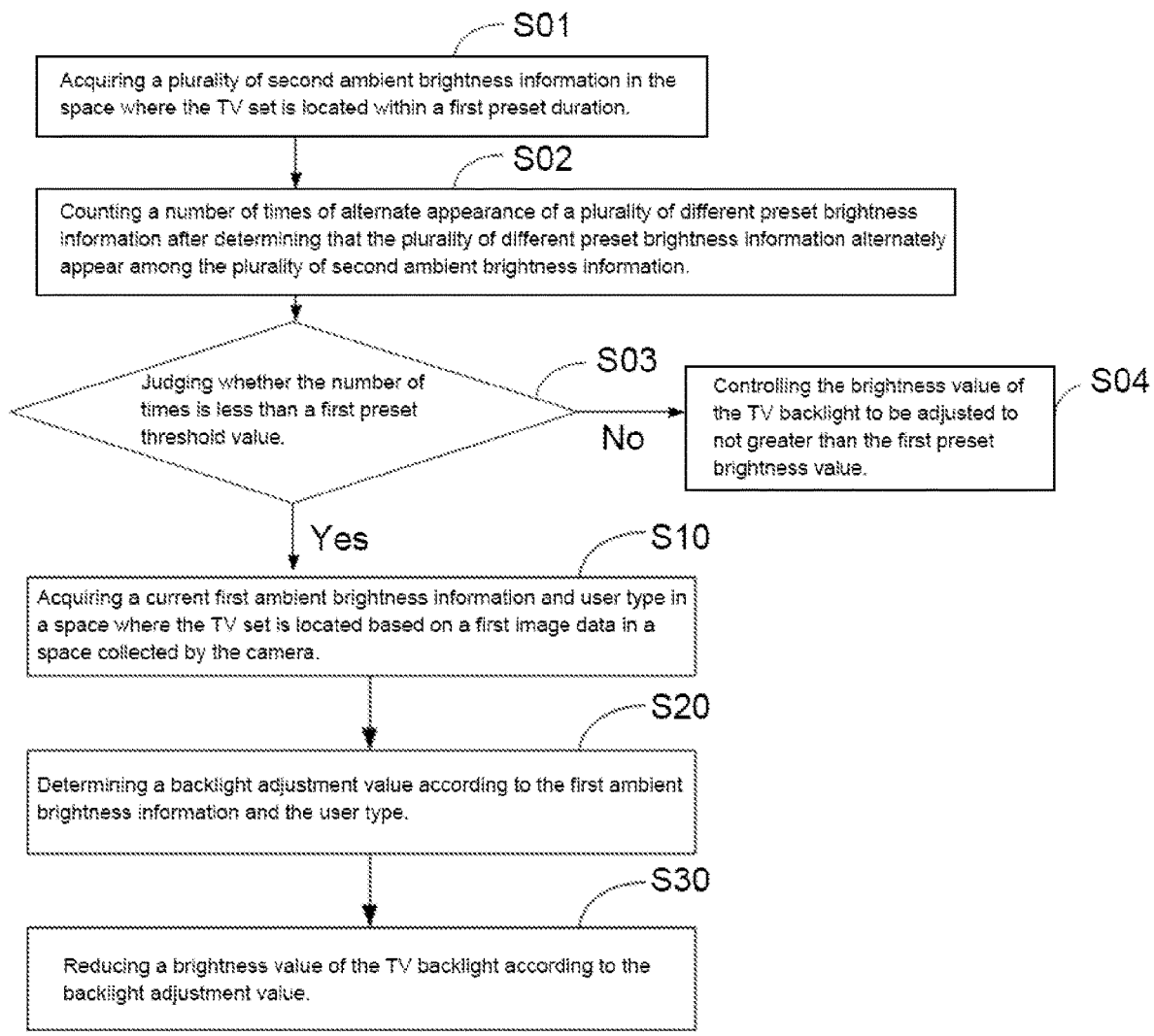
FIG. 4 is a flow diagram of a third embodiment of the TV backlight control method of the present disclosure.

Further, based on any of the above embodiments, a third embodiment of the TV backlight control method of the present disclosure is proposed. In the third embodiment, according to FIG. 4, the operation S10 is preceded by:

Operation S01, acquiring a plurality of second ambient brightness information in the space where the TV set is located within a first preset duration.

The first preset duration can be set to a shorter time, which can be set according to actual requirements. Within the first preset duration, an interval time for acquiring adjacent two second ambient brightness information among the plurality of second ambient brightness information is the same. For example, the first preset duration can be selected to be 5 seconds. The method of acquiring the second ambient brightness information can be specifically referred to the first ambient brightness information and will not be described here.

Operation S02, counting a number of times of alternate appearance of a plurality of different preset brightness information after determining that the plurality of different preset brightness information alternately appear among the plurality of second ambient brightness information.

Preset brightness information is specifically preset information representing brightness of different environments in space. For example, the preset brightness information may specifically include three states: dark state, highlight state and normal state. When adjacent three second ambient brightness information are different and are the three preset brightness information among the plurality of second ambient brightness information, a statistical number can be increased by one time. For example, the acquired plurality of second ambient brightness information are "highlighted, normal, dark, dark, highlighted, normal, highlighted, normal, dark, normal, highlighted, dark", and the number of alternating occurrences of the plurality of different preset brightness information is specifically four times.

Operation S03, judging whether the number of times is less than a first preset threshold value.

The first preset threshold can be set according to actual requirements.

After determining that the number of times is less than the first preset threshold, the operations S10 to S30, etc. are executed. After determining that the number of times is not less than the first preset threshold, operation S04 is executed.

Operation S04, controlling the brightness value of the TV backlight to be adjusted to not greater than the first preset brightness value.

The first preset brightness value can be set according to actual requirements. The brightness value of the backlight of the TV set is adjusted to be not more than the first preset brightness value, so that the backlight of the TV set is in a dark state.

When the TV is used in scenes with weak light, the TV itself has backlight. Dynamic images make the light intensity of the light source projected by the TV changes in real time. And then through diffuse reflection of the environment, frequent dynamic changes of ambient brightness are formed. In this embodiment, whether the brightness in the space where the TV set is currently located is changing frequently through the above-mentioned method is identified. If frequent changes are made, the TV backlight adjustment value is set to be not more than the first preset brightness value. If it does not change frequently, the backlight is adjusted according to the ambient brightness and the user type, so as to prevent the frequent adjustment of the TV backlight caused by the frequent change of the ambient brightness from affecting the picture display quality, thus ensuring the stability of the TV backlight and ensuring the picture display quality.

Figure 5:
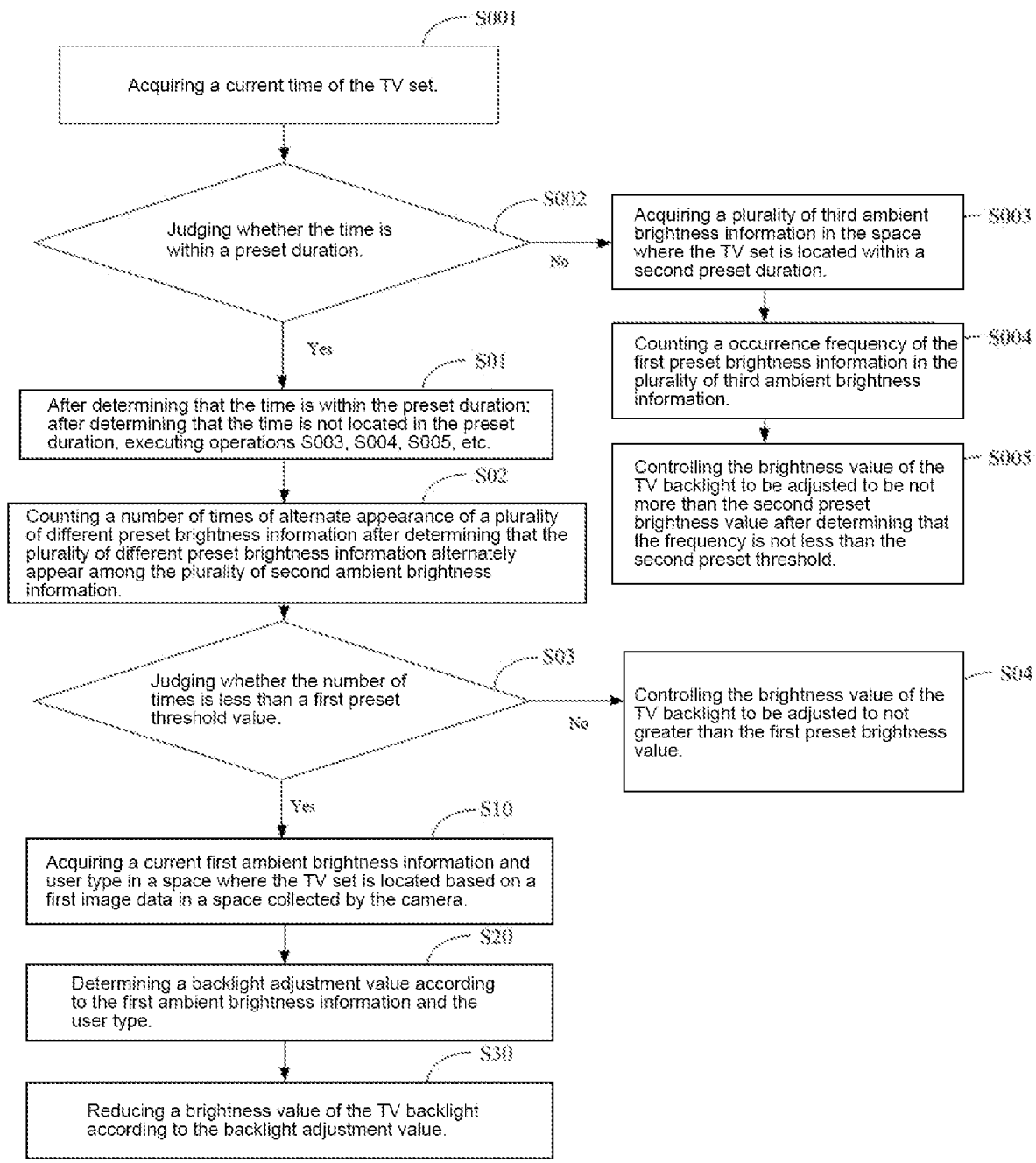
FIG. 5 is a flow diagram of a fourth embodiment of the TV backlight control method of the present disclosure.

Further, based on the third embodiment, a fourth embodiment of the TV backlight control method of the present disclosure is proposed. In the fourth embodiment, according to FIG. 5, the operation S01 is preceded by:

Operation S001, acquiring a current time of the TV set.

The time here specifically refers to the current system time in the TV system.

Operation S002, judging whether the time is within a preset duration.

The preset duration here is specifically a time period indicating that the ambient brightness is in a bright state.

Executing the operation S01 after determining that the time is within the preset duration; after determining that the time is not located in the preset duration, executing operations S003, S004, S005, etc.

For example, the default period may be set from 6:00 a.m. to 7:00 p.m. each day. When the current time is between 6:00 a.m. and 7:00 p.m., it is determined that the time is within the preset duration; when the current time is between 7:00 p.m. and 6:00 a.m. the next day, it is determined that the time is not within the preset duration.

Operation S003, acquiring a plurality of third ambient brightness information in the space where the TV set is located within a second preset duration.

The second preset duration can be set to a shorter time, which can be set according to actual needs. Within the second preset duration, the interval time for acquiring adjacent two third ambient brightness information among the plurality of third ambient brightness information is the same. For example, the second preset duration may be selected to be 10 seconds. The method of acquiring the third ambient brightness information can specifically refer to the first ambient brightness information and will not be described here.

Operation S004, counting a occurrence frequency of the first preset brightness information in the plurality of third ambient brightness information.

Here, the first preset brightness information is specifically a dark state. For example, the obtained plurality of third ambient brightness information are "dark, normal, dark, dark, dark, normal, highlighted, dark, dark, normal, highlighted, dark", and the frequency of the first preset brightness information is specifically 7 times.

Operation S005, controlling the brightness value of the TV backlight to be adjusted to be not more than the second preset brightness value after determining that the frequency is not less than the second preset threshold.

A size of a second preset threshold may be set according to actual requirements. For example, 40% of the total number of third ambient luminance information is used as the second preset threshold value. The brightness value of the TV backlight is adjusted to be not more than the second preset brightness value, so that the TV backlight is adjusted to a dark state.

In this embodiment, by identifying whether the current time is within a preset duration, and if it is within the preset duration, adjusting the TV backlight according to operations S01 to S04, etc., under the condition that the daytime brightness is large, even if the TV is used in a scene with weak light, the stability of the TV backlight can be ensured and the picture display quality can be ensured. If it is not within the preset duration, the TV backlight is adjusted according to operations S003 to S005, etc. so as to ensure the stability of the TV backlight and the picture display quality under the scene with weak light at night. Through the above method, the brightness state of the current ambient brightness is accurately identified, therefor further ensuring an accurate adjustment of the TV backlight.

Further, based on any of the above embodiments, a fifth embodiment of the TV backlight control method of the present disclosure is proposed. In the fifth embodiment, operation S10 includes: acquiring a current first ambient brightness information and user type in a space where the TV set is located based on a first image data in a space collected by the camera; and/or, operation S01 includes: acquiring a plurality of second ambient brightness information in the space where the TV set is located within the first preset duration, based on a second image data in the space collected by the camera; and/or, operation S003 includes: acquiring a plurality of second ambient brightness information in the space where the TV set is located within the second preset duration, based on a third image data in the space collected by the camera.

The camera here is specifically the camera mounted on the TV set. An upper layer application of the TV set monitors the camera, and the camera forms a callback message to feed back the image data (the first image data, the second image data and the third image data) collected by the camera in the space where the TV set is located to the upper layer application. Specifically, the first image data are image frames acquired by the camera in real time. The second image data are a plurality of image frames acquired by the camera in real time at the same time interval within the first preset time length. The third image data are a plurality of image frames acquired by the camera in real time at the same time interval within the second preset time length. The ways of determining the ambient brightness information according to the above-mentioned image data are the same, for example, the brightness value of an image frame can be calculated according to a brightness value of each pixel point in the image frame, and when the brightness value of the image frame is not less than the first brightness, the corresponding ambient brightness state information of the image frame is in a highlighted state; the brightness value of the image frame is less than the second brightness, and the corresponding ambient brightness state information of the image frame is in a dark state. The second brightness is less than the first brightness. When the brightness value of the image frame is between the first brightness and the second brightness, the corresponding ambient brightness state information of the image frame is in a normal state. In addition, if the user type is determined according to the image data, the face features in the image frame can be recognized, and whether the user type is a child or an adult can be determined according to the face features.

In this embodiment, through the way that the TV set is equipped with a camera, the perception of the ambient brightness and the user type in the space where the TV set is located is realized, so that the backlight of the TV set is automatically and accurately adjusted, and the diversified functions of the TV set equipped with the camera are enriched.

In addition, embodiments of the present disclosure also propose a readable storage medium on which a TV backlight control program is stored, and when a TV backlight control program is executed by a processor, relevant operations of any embodiment of the above TV backlight control method are implemented.

It should be noted that, in this article, the terms "comprising", "including" or any other variant thereof are intended to encompass non-exclusive inclusion such that a process, method, article, or system that includes a series of elements includes not only those elements, but also other elements that are not explicitly listed, or also elements inherent to such a process, method, article, or system. Without further restrictions, the element defined by the statement "include a . . . " does not exclude the existence of other identical elements in the process, method, article or system that includes the element.

The above-mentioned serial numbers of embodiments of the present disclosure are for description only and do not represent the advantages and disadvantages of the embodiments.

From the above description of embodiments, it will be apparent to those skilled in the art that the methods of the above embodiments can be implemented by means of software plus the necessary universal hardware platform, of course also by means of hardware, but in many cases the former is a better embodiment. Based on this understanding, The technical scheme of the present disclosure can be embodied in the form of software products in essence or part that contributes to the related art, The computer software product is stored in a storage medium (e.g., a ROM/RAM, a magnetic disk, an optical disk) as described above and includes instructions to cause a terminal device (which may be a mobile phone, a computer, a server, an air conditioner, a network device, etc.) to perform the methods described in various embodiments of the present disclosure.

The above is only a preferred embodiment of the present disclosure and is not thus limiting the scope of the patent of the present disclosure. Any equivalent structure or equivalent process transformation made by utilizing the contents of the specification and the accompanying drawings of the present disclosure, or any direct or indirect application to other related technical fields, is likewise included in the scope of the patent of the present disclosure.

What is claimed is:

1. A TV backlight control method, comprising the following operations:
acquiring current first ambient brightness information and a user type in a space where a TV set is located;
determining a backlight adjustment value according to the first ambient brightness information and the user type; and
reducing a brightness value of a TV backlight of the TV set, according to the backlight adjustment value; wherein
the operation of determining the backlight adjustment value according to the first ambient brightness information and the user type comprises:
determining a first adjustment value according to the first ambient brightness information;
determining a second adjustment value according to the user type; and
determining the backlight adjustment value according to the first adjustment value and the second adjustment value; wherein
the operation of determining the first adjustment value according to the first ambient brightness information comprises:
determining that the first adjustment value is a first value after determining that the first ambient brightness information is first preset brightness information;
determining that the first adjustment value is a second value after determining that the first ambient brightness information is second preset brightness information;
wherein, a brightness corresponding to the first preset brightness information is smaller than a brightness corresponding to the second preset brightness information, and the first value is greater than the second value; and/or,
the operation of determining the second adjustment value according to the user type comprises:
determining that the second adjustment value is a third value after determining that the user type is a child;
determining that the second adjustment value is a fourth value after determining that the user type is an adult;
wherein, the third value is greater than the fourth value;
prior to the operation of acquiring the current first ambient brightness information and the user type in the space where the TV set is located, the method further comprises:
acquiring a plurality of second ambient brightness information in the space where the TV set is located within a first preset duration;
counting a number of times of alternate appearance of a plurality of different preset brightness information after determining that the plurality of different preset brightness information alternately appear among the plurality of second ambient brightness information;
determining whether the number of times is less than a first preset threshold value;
after determining that the number of times is less than the first preset threshold value, executing the operation of acquiring the current first ambient brightness information and the user type in the space where the TV set is located.

2. The TV backlight control method of claim 1, wherein, after the operation of determining whether the number of times is less than the first preset threshold value, the method further comprises:
controlling the brightness value of the TV backlight to be adjusted to be not greater than a first preset brightness value after determining that the number of times is not less than the first preset threshold value.

3. The TV backlight control method of claim 2, wherein before the operation of acquiring the plurality of second ambient brightness information in the space where the TV set is located within the first preset duration, the method further comprises:
acquiring a current time of the TV set;
determining whether the current time is within a preset duration;
after determining that the current time is within the preset duration, executing the operation of acquiring the plurality of second ambient brightness information in the space where the TV set is located within the first preset duration.

4. The TV backlight control method of claim 3, wherein, after the operation of determining whether the current time is within the preset duration, the method further comprises:
acquiring a plurality of third ambient brightness information in the space where the TV set is located within a second preset duration after determining that the current time is not within the preset duration;

calculating an occurrence frequency of the first preset brightness information in the plurality of third ambient brightness information;

controlling the brightness value of the TV backlight to be adjusted to be not greater than a second preset brightness value after determining that the occurrence frequency is not less than the second preset threshold value.

5. The TV backlight control method of claim 4, wherein the operation of acquiring the current first ambient brightness information and the user type in the space where the TV is located comprises:

acquiring the current first ambient brightness information and the user type in the space where the TV set is located based on first image data in the space collected by a camera; and/or, the operation of acquiring the plurality of second ambient brightness information in the space where the TV set is located within the first preset time duration comprises:

acquiring the plurality of second ambient brightness information in the space where the TV set is located based on second image data in the space collected by the camera within the first preset duration; and/or, the operation of acquiring the plurality of third ambient brightness information in the space where the TV set is located within the second preset duration comprises:

acquiring the plurality of second ambient brightness information in the space where the TV set is located in the second preset duration, based on third image data in the space collected by the camera.

6. A control device, wherein the control device comprises: a memory, a processor, and a TV backlight control program stored on the memory and operable on the processor, wherein when the TV backlight control program is executed by the processor, the following operations are carried out:

acquiring current first ambient brightness information and a user type in a space where a TV set is located;

determining a backlight adjustment value according to the first ambient brightness information and the user type; and reducing a brightness value of a TV backlight of the TV set, according to the backlight adjustment value; wherein the operation of determining the backlight adjustment value according to the first ambient brightness information and the user type comprises:

determining a first adjustment value according to the first ambient brightness information;

determining a second adjustment value according to the user type; and determining the backlight adjustment value according to the first adjustment value and the second adjustment value; wherein the operation of determining the first adjustment value according to the first ambient brightness information comprises:

determining that the first adjustment value is a first value after determining that the first ambient brightness information is first preset brightness information;

determining that the first adjustment value is a second value after determining that the first ambient brightness information is second preset brightness information;

wherein, a brightness corresponding to the first preset brightness information is smaller than a brightness corresponding to the second preset brightness information, and the first value is greater than the second value; and/or, the operation of determining the second adjustment value according to the user type comprises:

determining that the second adjustment value is a third value after determining that the user type is a child;

determining that the second adjustment value is a fourth value after determining that the user type is an adult;

wherein, the third value is greater than the fourth value;

prior to the operation of acquiring the current first ambient brightness information and the user type in the space where the TV set is located, the following operations are further carried out:

acquiring a plurality of second ambient brightness information in the space where the TV set is located within a first preset duration;

counting a number of times of alternate appearance of a plurality of different preset brightness information after determining that the plurality of different preset brightness information alternately appear among the plurality of second ambient brightness information;

determining whether the number of times is less than a first preset threshold value;

after determining that the number of times is less than the first preset threshold value, executing the operation of acquiring the current first ambient brightness information and the user type in the space where the TV set is located.

7. The control device of claim 6, wherein, after the operation of determining whether the number of times is less than the first preset threshold value, the following operations are further carried out:

controlling the brightness value of the TV backlight to be adjusted to be not greater than a first preset brightness value after determining that the number of times is not less than the first preset threshold value.

8. The control device of claim 6, wherein before the operation of acquiring the plurality of second ambient brightness information in the space where the TV set is located within the first preset duration, the following operations are further carried out:

acquiring a current time of the TV set;

determining whether the current time is within a preset duration;

after determining that the current time is within the preset duration, executing the operation of acquiring the plurality of second ambient brightness information in the space where the TV set is located within the first preset duration.

9. A TV set, comprising:

a camera;

a display device comprising a display panel and a backlight module connected with the display panel; and the control device according to claim 6, wherein both of the camera and the backlight module are connected with the control device.

10. A non-transitory readable storage medium, wherein a TV backlight control program is stored on the readable storage medium, and when executed by a processor, the TV backlight control program implements a TV backlight control method, wherein the TV backlight control method comprises the following operations:

acquiring current first ambient brightness information and a user type in a space where a TV set is located;

determining a backlight adjustment value according to the first ambient brightness information and the user type; and reducing a brightness value of a TV backlight of the TV set, according to the backlight adjustment value; wherein the operation of determining the backlight adjustment value according to the first ambient brightness information and the user type comprises:

determining a first adjustment value according to the first ambient brightness information;

determining a second adjustment value according to the user type; and determining the backlight adjustment value according to the first adjustment value and the second adjustment value; wherein the operation of determining the first adjustment value according to the first ambient brightness information comprises:

determining that the first adjustment value is a first value after determining that the first ambient brightness information is first preset brightness information;

determining that the first adjustment value is a second value after determining that the first ambient brightness information is second preset brightness information;

wherein, a brightness corresponding to the first preset brightness information is smaller than a brightness corresponding to the second preset brightness information, and the first value is greater than the second value; and/or, the operation of determining the second adjustment value according to the user type comprises:

determining that the second adjustment value is a third value after determining that the user type is a child;

determining that the second adjustment value is a fourth value after determining that the user type is an adult;

wherein, the third value is greater than the fourth value;

prior to the operation of acquiring the current first ambient brightness information and the user type in the space where the TV set is located, the method further comprises:

acquiring a plurality of second ambient brightness information in the space where the TV set is located within a first preset duration;

counting a number of times of alternate appearance of a plurality of different preset brightness information after determining that the plurality of different preset brightness information alternately appear among the plurality of second ambient brightness information;

determining whether the number of times is less than a first preset threshold value;

after determining that the number of times is less than the first preset threshold value, executing the operation of acquiring the current first ambient brightness information and the user type in the space where the TV set is located.

11. The non-transitory readable storage medium of claim 10, wherein, after the operation of determining whether the number of times is less than the first preset threshold value, the TV backlight control method further comprises:

controlling the brightness value of the TV backlight to be adjusted to be not greater than a first preset brightness value after determining that the number of times is not less than the first preset threshold value.

* * * * *